United States Patent [19]

Franks

[11] Patent Number: 4,546,551

[45] Date of Patent: Oct. 15, 1985

[54] ELECTRICAL CONTROL SYSTEM

[75] Inventor: Jeffrey L. Franks, Houston, Tex.

[73] Assignee: Prince Corporation, Holland, Mich.

[21] Appl. No.: 478,364

[22] Filed: Mar. 24, 1983

[51] Int. Cl.[4] ............................................. G01C 17/28
[52] U.S. Cl. ....................................... 33/356; 33/361; 364/559
[58] Field of Search ................. 33/356, 357, 358, 359, 33/361, 362; 364/559, 557

[56] References Cited

U.S. PATENT DOCUMENTS

| 2,852,859 | 9/1958 | Depp . | |
|---|---|---|---|
| 3,744,312 | 7/1973 | Anderson . | |
| 3,903,610 | 9/1975 | Heaviside et al. . | |
| 3,991,361 | 11/1976 | Mattern et al. . | |
| 4,024,382 | 5/1977 | Fowler . | |
| 4,030,204 | 6/1977 | Edwards . | |
| 4,112,755 | 9/1978 | Sullivan . | |
| 4,179,741 | 12/1979 | Rossani | 33/356 |
| 4,277,751 | 7/1981 | Lawson et al. . | |
| 4,336,596 | 6/1982 | Martin | 33/356 |
| 4,373,271 | 2/1983 | Nitz . | |
| 4,413,424 | 11/1983 | Sasaki et al. | 33/356 |
| 4,414,753 | 11/1983 | Moulin et al. | 33/357 |
| 4,416,067 | 11/1983 | Scherer et al. | 33/357 X |
| 4,429,469 | 2/1984 | Tsushima et al. | 33/361 |
| 4,445,279 | 5/1984 | Tsushima et al. | 33/356 |

FOREIGN PATENT DOCUMENTS 116211 7/1982 Japan .................................... 33/356

OTHER PUBLICATIONS

Magnetic Field Sensor and Its Application to Automobiles, by Hisatsugu Itoh, 1980 SAE paper, SAE/-SP-80/458.

*Primary Examiner*—William D. Martin, Jr.
*Attorney, Agent, or Firm*—Price, Heneveld, Huizenga & Cooper

[57] ABSTRACT

The system of the present invention provides an electrical digital compass for use in a vehicle which includes a unique compensation and variation correction control which is readily set by the vehicle operator with the operation of push-button switches. The electrical display system and circuitry includes a microprocessor for comparing the information from a magnetic field sensor when the vehicle is aligned in a magnetically known direction and for providing a correction signal to assure the displayed output corresponds to the predetermined magnetic field alignment. In areas where magnetic variation is significant, the system generates, stores and processes a correction signal to assure the displayed output corresponds to the true heading of the vehicle. In one embodiment of the invention, a temperature sensor is provided to indicate the ambient temperature in which the vehicle is operating and which is digitally displayed to the operator.

26 Claims, 5 Drawing Figures

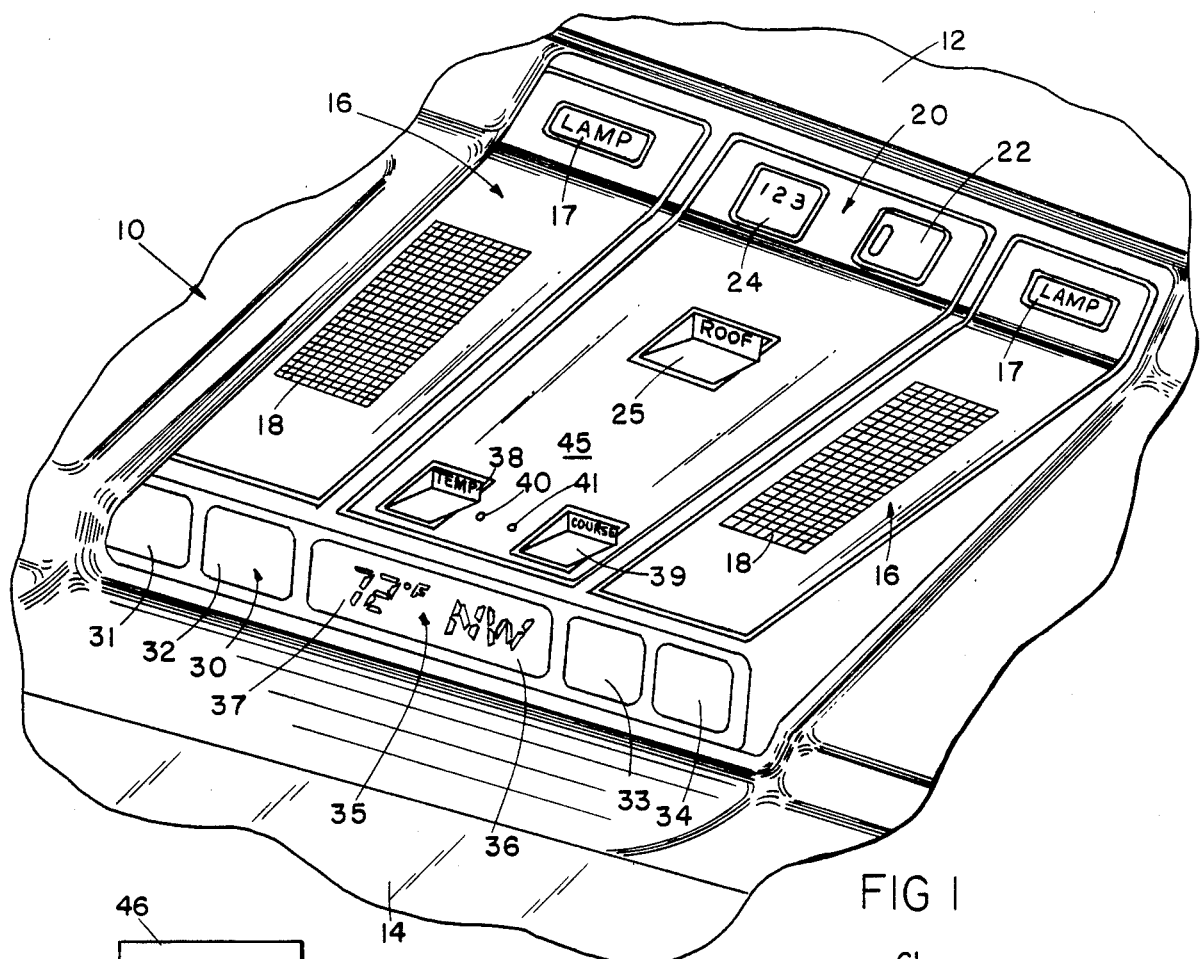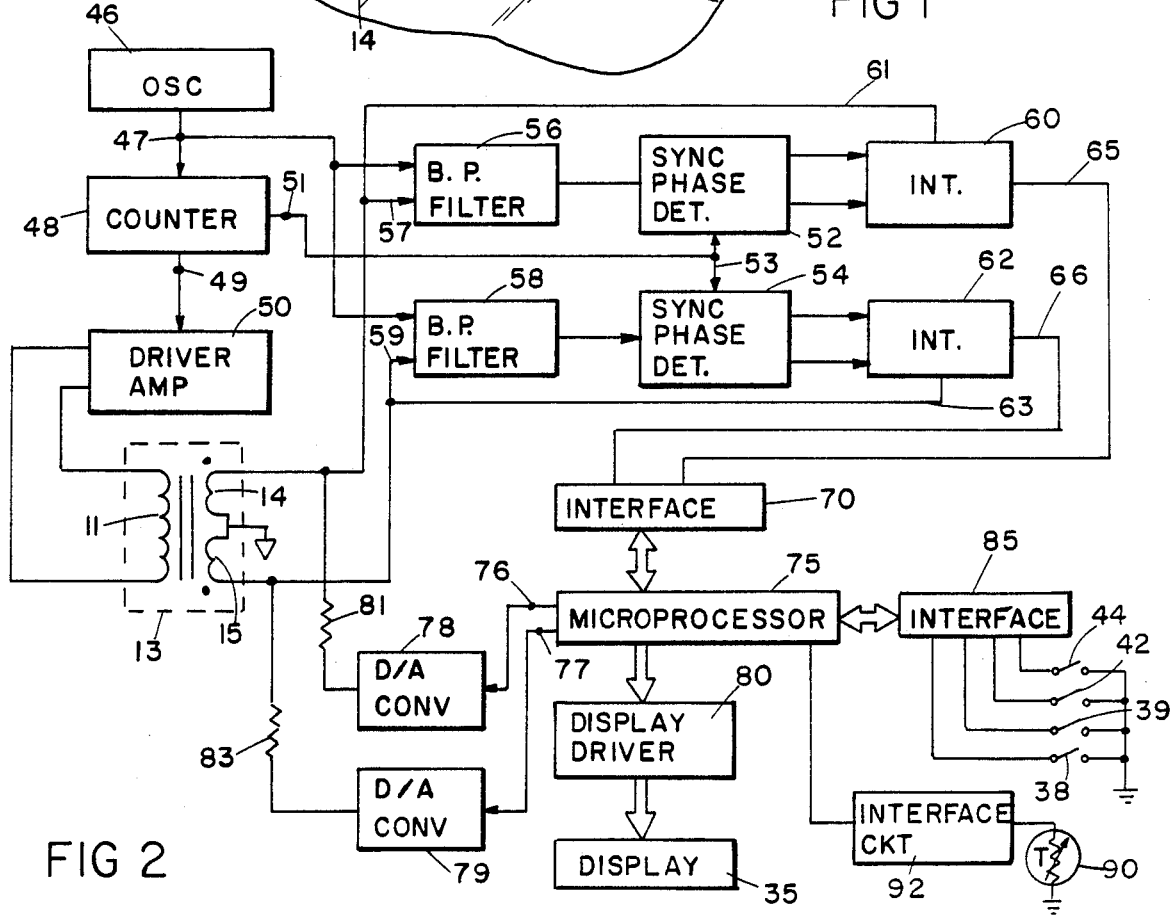

ELECTRICAL CONTROL SYSTEM

BACKGROUND OF THE INVENTION

The present invention relates to an electrical control system for a vehicle and particularly one for use in connection with a display of the vehicle's heading.

In recent years, digital electronics technology has been employed in the automotive industry to provide, for example, the display of speed and engine operating parameters to the vehicle user.

In a compass for use in a vehicle, it is necessary to compensate the compass to correct for stray magnetic fields and ferromagnetic material in the vicinity of the sensor. For accuracy, a second and different correction for variation in the earth's magnetic field as a function of the geographic location of the vehicle is desirable. Thus, for example, in the United States, the magnetic variation between true north and magnetic north from the east to west coast is approximately 40°. Thus, a compass system installed in a vehicle which may travel in various parts of the country during use should include means for correcting for the earth's magnetic field variation as well as means for compensating for the particular installation of the compass in an individual vehicle.

Typically, vehicle mounted compasses have been mechanical types with rotating compass cards mounted in a viscous damping media. An electrical compass has been described in a 1980 SAE paper entitled *Magnetic Field Sensor and Its Application to Automobiles* by Hisatsugu Itoh, SAE/SP-80/458. This compass employs a flux-gate sensor and solid state circuits and compensation correction only is provided by manually adjustable potentiometers in a circuit coupled to the flux-gate sensor. U.S. Pat. No. 4,030,204 discloses a vehicle automotive compass in which Hall effect sensors are employed and in which compensation is provided by the utilization of conventional adjustably mounted magnets as frequently employed in conventional vehicle compasses employing movable compass cards.

SUMMARY OF THE PRESENT INVENTION

The system of the present invention provides an electrical digital compass for use in a vehicle which includes a unique compensation and variation correction control which is readily set by the vehicle operator with the operation of push-button switches. The electrical display system and circuitry includes a microprocessor for comparing the information from a magnetic field sensor when the vehicle is aligned in a magnetically known direction and for automatically providing a correction signal to assure the displayed output corresponds to the predetermined magnetic field alignment. In areas where magnetic variation is significant, the system generates, stores and processes a correction signal to assure the displayed output corresponds to the true heading of the vehicle.

In a preferred embodiment of the invention, a microprocessor is employed and programmed to process signals from the magnetic sensor and provide compensation and variation correction information which is employed to process signals provided by the magnetic sensor and provide digital display output signals indicating the vehicle's true direction. In one embodiment of the invention, temperature sensing means is provided to indicate the ambient temperature in which the vehicle is operating and which is digitally displayed to the operator. The temperature display may also provide an alarm signal when a predetermined temperature has been reached indicating possible dnagerous driving conditions.

These and other features, advantages and objects of the present invention will become apparent upon reading the following description thereof together with reference to the accompanying drawings, in which:

BRIEF DESCRIPTION OF THE DRAWINGS

FIG. 1 is a fragmentary, perspective view of a display and control module embodying the present invention;

FIG. 2 is an electrical circuit diagram, partially in block and schematic form, of a system embodying the present invention;

DETAILED DESCRIPTION OF THE PREFERRED EMBODIMENT

Figure 3:
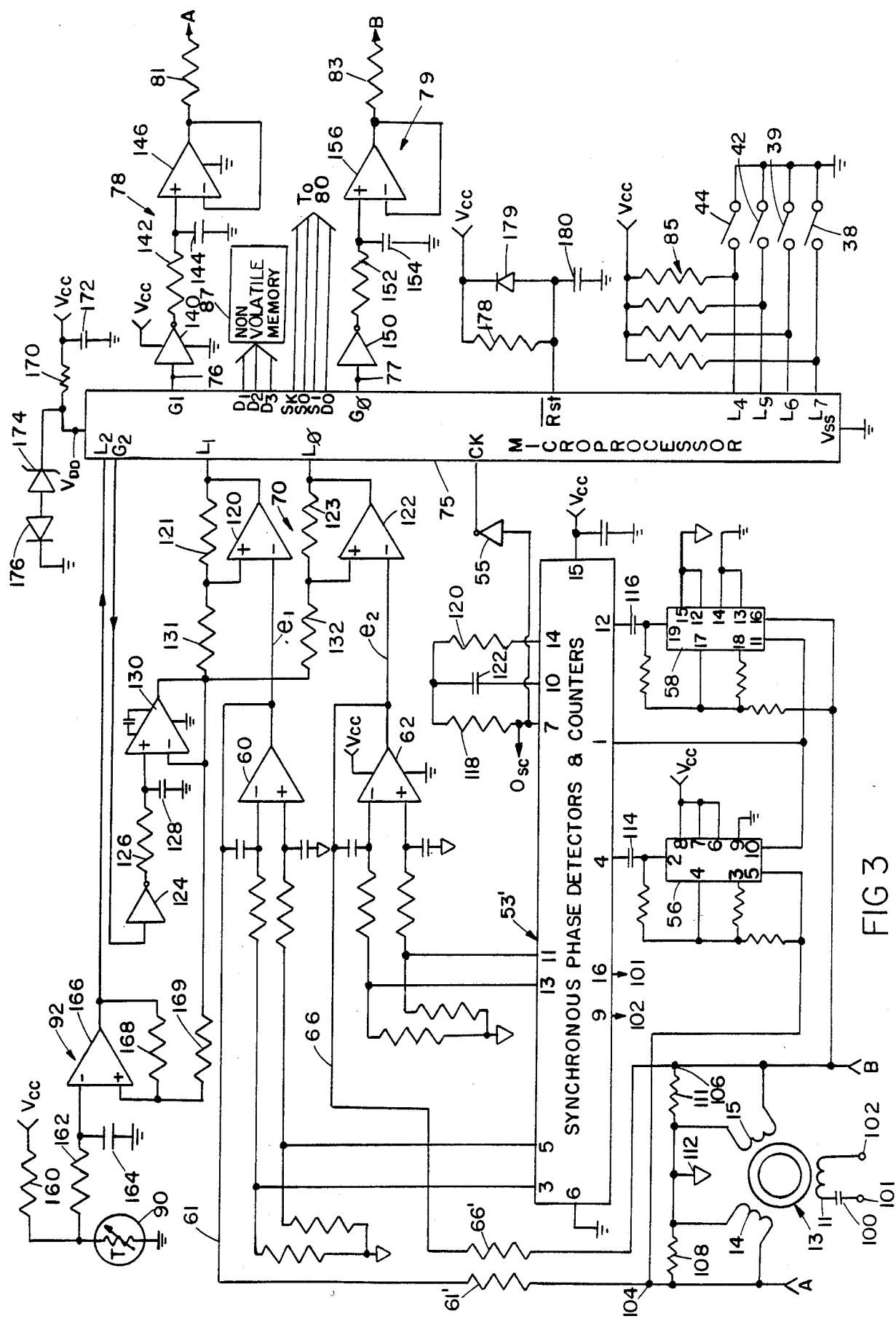
FIG. 3 is a partial detailed electrical circuit diagram in block and schematic form of the system embodying the present invention.

Referring initially to FIG. 1, there is shown a control and display module 10 which is adapted to be integrally included in a vehicle during manufacturing, although it could be separately added at a later time. The module 10 is positioned in the roof 12 of a vehicle and centered near the top edge of windshield 14, typically just above the rearward mirror. Module 10 includes a pair of map reading lamps 16 having switches 17 for operating lamp means positioned behind lenses 18 which direct illumination into the lap area of either the vehicle driver or passenger side of the vehicle, depending on which switch is actuated. The center of the module includes a garage door opening transmitter 20 including a three-position switch 22 for actuating any one of three different garage door remote control units by the actuation of push-button switch 24. Module 10 may alos include an electrical sunroof control switch 25. The construction of the lamp modules 16 and garage door transmitter module 20 is generally disclosed in U.S. Pat. No. 4,241,870, issued Dec. 30, 1980.

Module 10 additionally includes a separate display panel 30 which includes display indicators 31, 32, 33 and 34 for displaying vehicle operating parameters such as engine temperature, oil pressure, generator and fuel warning or the like which can either be displayed in a digital alpha-numeric format or as warning lights. The center of display module 30 includes a digital display 35 providing, in one embodiment of the present invention, an octant display 36 of the vehicle heading in an alpha format and on the left side of display 35, a temperature display 37 providing fahrenheit or centigrade display of the exterior ambient temperature of the air near the vehicle as well as a warning signal when road conditions approach freezing, as will be described hereinafter. The temperature display circuit is actuated by a push-button temperature switch 38 while the compass circuit is actuated by a push-button switch 39. A pair of apertures 40 and 41 provide limited access to calibrate and compensation switches 42 and 44, respectively (FIG. 2), which are only occasionally used and are push switches mounted to a circuit board positioned behind panel 45 and are actuated by a pointed instrument such as a ball point pen. Thus, module 10 incorporates, at a single overhead location conveniently positioned for operator use, a control and information display center for the vehicle.

As shown in FIG. 2, the compass and temperature display system includes an oscillator 46 which, in the preferred embodiment, is an R-C oscillator having an output frequency of approximately 100 kHz at output terminal 47 thereof. The output signal from oscillator 46 is applied to a counter circuit 48 providing 500 Hz at output terminal 49 which is applied to a driver amplifier 50 which subsequently applies the 500 Hz signals to excitation winding 11 of a flux-gate sensor 13. Counter 48 also provides a kHz signal at output terminal 51 which is applied to synchronous phase detector circuits 52 and 54. The output terminal 47 of oscillator 46 is also coupled to clock input terminals of digital bandpass filters 56 and 58. Filters 56 and 58 also include signal input terminals 57 and 59, respectively, coupled to one end of sensing coils 14 and 15 of sensor 13, as shown in FIG. 2, with the remaining terminals of coils 14 and 15 commonly coupled to a floating ground.

The output of bandpass filters 56 and 58 are coupled to the input terminals of synchronous phase detectors 52 and 54 such that second harmonic frequency signals are applied to each of the synchronous phase detectors which are actuated by an enabling signal from counter 48 via an enabling line 53 to apply positive and negative half-cycle sinusoidal signals received from sensing coils 14 and 15 through bandpass filters 56 and 58 to integrating and inverting amplifier circuits 60 and 62. The closed loop gain of the system is controlled through a feedback path including conductors 61 and 63 extending between integrating amplifier 60 and flux-gate sense winding 14 and integrator 62 and flux-gate sense winding 15, respectively. At the output terminals 65 and 66 of integrators 60 and 62, respectively, there is thus provided DC varying signals $e_1$ and $e_2$, respectively, which represent the direction information from sensing coils 14 and 15. The amplitude and polarity of $e_1$ and $e_2$ varies with vehicle direction with respect to the earth's magnetic field. These DC varying signals are applied to a suitable interface circuit 70, including for example, suitable amplifiers and an AD converter for converting the DC signal information to digital signals. Circuit 70, in turn, is coupled to a microprocessor 75 which includes associated RAM and ROM memories with the ROM programmed to mathematically derive an output control signal in the form of the arc tangent of the ratio $e_1/e_2$ to provide a digital output control signal applied to a display driver circuit 80 for displays 35 such that octant direction and temperature information can be displayed to the vehicle operator. The processing of signals $e_1$ and $e_2$ from integrator circuits 60 and 62 by the microprocessor and program to provide the $\tan^{-1}(e_1/e_2)$ in a digital format for octant display of vehicle direction is entirely conventional.

Microprocessor 75 also receives input signals from switches 38, 39, 42 and 44 through an interface circuit 85 and from temperature sensing means such as a thermistor 90 through interface circuit 92. Thermistor 90 is positioned exterior of the vehicle such as in the front grill area to measure the outside ambient air temperature.

The microprocessor includes output terminals 76 and 77 coupled to D/A converters 78 and 79, respectively.

Figures 4, 5:
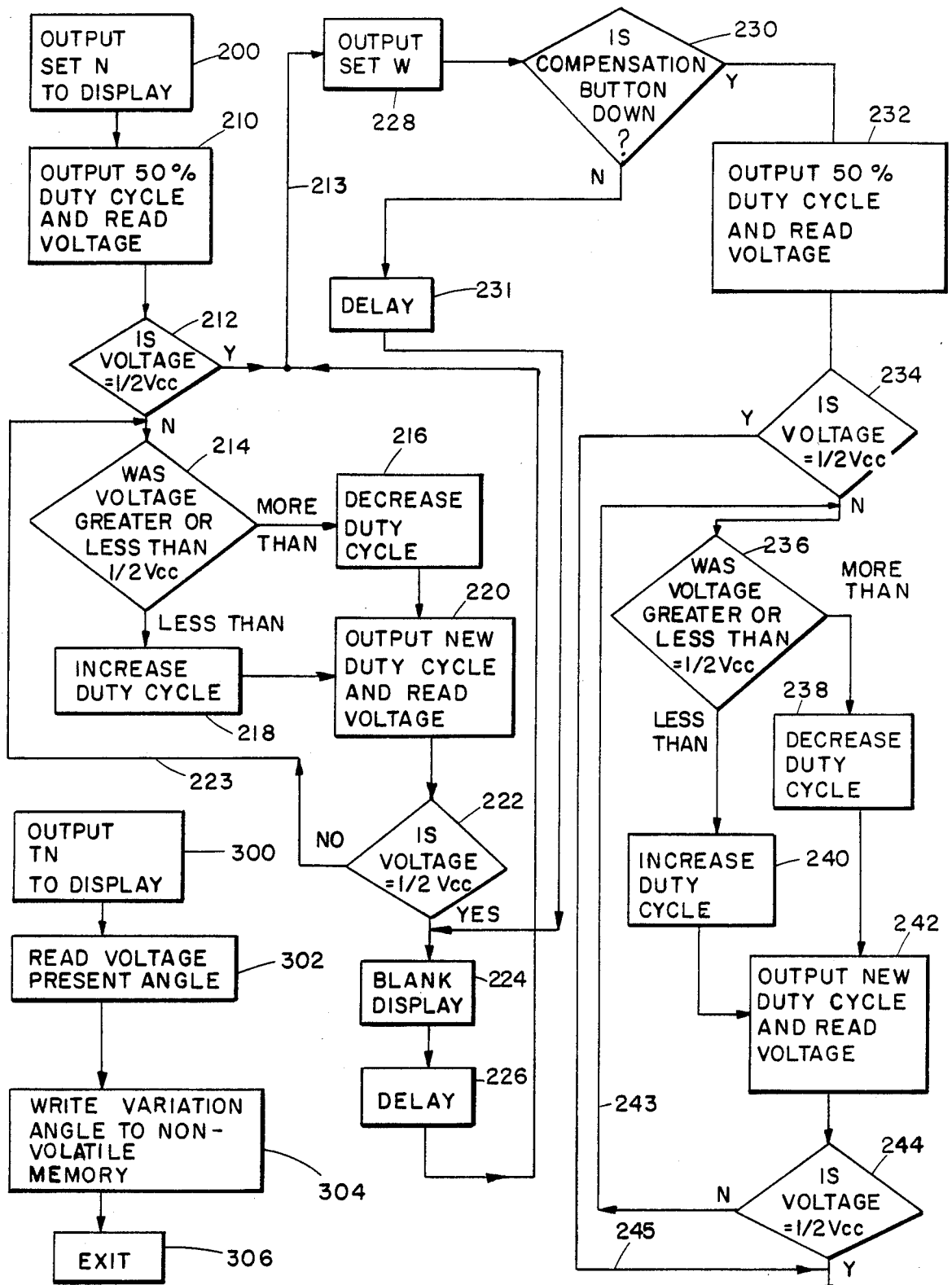
FIG. 4 is a flow diagram of the programming for a microprocessor incorporated in one embodiment of the present invention.
FIG. 5 is a flow diagram of the programming of the microprocessor for the variation function of one embodiment of the present invention.

The outputs of the D/A converters are coupled to sensing coils 14 and 15 through resistors 81 and 83, respectively to provide correction signals to the sensor 13, as described below. A detailed description of the operation of the bandpass filters and synchronous phase detectors to provide direction representative signals is presented in U.S. Pat. No. 4,424,631, entitled ELECTRICAL COMPASS, issued on Jan. 10, 1984 the disclosure of which is incorporated hereby by reference. Having described the overall circuit arrangement by which the microprocessor 75 receives direction indicating signals from the flux-gate sensor 13 and provides a compass output display therefrom and provides correction information through D/A converters 78 and 79 to the flux-gate sensor as well as receives and processes temperature information, a more detailed description of the circuit of the present invention together with the operation of the system is presented in connection with first FIG. 3 and subsequently FIGS. 4 and 5.

In FIG. 3, the same reference numerals corresponding to structure shown in FIG. 2 are employed. In the Figure, the flux-gate sensor 13 has its excitation coil 11 AC coupled by means of a capacitor 100 to the driver amplifier 50 (FIG. 2) through input terminals 101 and 102. The excitation frequency is, in the preferred embodiment of the invention, approximately 500 Hz. The north/south detection winding 14 of sensor 13 has an output terminal 104 coupled to bandpass filter 56 at input terminal 5 thereof while east/west sensing winding 15 has its output terminal 106 coupled to input terminal 16 of bandpass filter 58. Filters 56 and 58 are each ½ of an integrated circuit chip Model No. MF10BN available from National Semiconductor Corporation and are coupled to a source of operating voltage $V_{cc}$ which is a regulated nine volt power supply derived from the vehicle's twelve volt battery. The north/south and east/west windings 14 and 15, respectively, includes resistors 108 and 110 coupled in parallel across the windings which have their terminals remote from their output terminals coupled to a floating ground 112 which is +4.5 volts DC in the preferred embodiment of the invention.

The bandpass filters 56 and 58 and their operation is described in greater detail in U.S. Pat. No. 4,424,631 and provide at output terminals 2 and 19 thereof second harmonic 1 kHz sinusoidal signals which are coupled by capacitors 114 and 116 to input terminals 4 and 12 of the synchronous phase detection circuits 52 and 54. Circuits 52 and 54 are combined on a single monolithic integrated circuit chip 53' which includes a 4016 National Semiconductor integrated circuit, an oscillator and counter circuits which supply 100 KHz timing signals at output pin 1 to inputs 10 and 11 of circuits 56 and 58, respectively. A 200 kHz R-C oscillator including resistor 118, 120 and capacitor 122 provides synchronous clock signals to the clock input of microprocessor 75 through inverter 55 and to the display driver 50 (FIG. 2). The sinusoidal second harmonic frequency signals at output terminals 3 and 5 and 11 and 13 alternate ½ cycles of 1 kHz information, the amplitude and sign of which is direction indicative, and are applied to the input terminals of the integrating circuits 60 and 62, respectively, including integrating resistive capacitive networks, as shown in FIG. 3.

The output of integrators 60 and 62 are varying DC level signals $e_1$ and $e_2$ which are applied to the negative input terminals of the interface circuit 70 comprising digital comparators 120 and 122, respectively. Signals $e_1$ and $e_2$ are representative of the north and south component of the sensed magnetic field as well as the orthogonal east and west component, respectively. The output of integrators 60 and 62 also are coupled via feedback lines 61 and 66 and gain controlling resistors 61' and 66' in a negative feedback control configuration. Each of the operational amplifiers 120 and 122 of circuit 70 have their positive input terminals coupled to output $G_2$ of microprocessor 75 which is a National Semiconductor COP345L microprocessor.

Output terminal $G_2$ provides a variable duty cycle signal which is time shared between 120 and 122 and is applied to a D to A converter including inverter circuit 124, integrator resistor 126 and capacitor 128 and operational amplifier 130 coupled as a voltage follower and having its output terminal coupled to the positive input terminals of digital commmparators 120 and 122 via resistors 131 and 132, respectively. Comparators 120 and 122 also include feedback resistors 121 and 123, respectively, for prevention of oscillation. The output signal at $G_2$ thus provides a variable duty cycle positive going signal, the average component of which is proportional to the amplitude of $e_1$ or $e_2$ or, as described in detail below in connection with the temperature sensing circuit including thermistor 90, the sensed temperature. The operation of the microprocessor, in response to digital input signals applied at the terminals $L_0$, $L_1$ and $L_2$ through comparators 120, 122 and 166 to provide a variable duty cycle output at terminal $G_2$, is described in the 1982 Cops Microcontroller Data Book published by National Semiconductor. Variable duty cycle output signals also applied to output terminal $G_1$ and $G_0$ of microprocessor 75 with the signal from terminal $G_1$ (which corresponds to output terminal 76 shown in FIG. 2) being applied to a D to A converter 78. The signal terminal $G_1$ provides a variable duty cycle output applied to inverter 140 and to the D to A converter 78 including integrating resistor 142 and capacitor 144 and to the positive input terminal of an operational amplifier 146 configured as a voltage follower and through current limiting resistor 81 to output terminal A which is commonly coupled to input terminal A of north/south winding 14 corresponding also to its output terminal 104. Similarly, the variable duty cycle output at $G_0$ corresponding to terminal 77, shown also in FIG. 2, is coupled to an inverter circuit 150 to D to A converter 79 including integrated resistor 153 and capacitor 154 through a voltage following amplifier 156 and to current limiting resistor 83 to output terminal B coupled to input terminal B of east/west coil 15 which also corresponds to terminal 106. These signals are internally monitored by the microprocessor to provide digital signals containing the direction information contained by $e_1$ and $e_2$ voltages to provide display output information to display driver 80 through output terminals $D_0$, SK, $S_0$ and SI.

The temperature sensing thermistor 90 is coupled to input terminal $L_2$ of microprocessor 75 by the voltage dividing interface circuit 92 including a voltage dividing resistor 160 coupled to the $+V_{cc}$ supply and to thermistor 90 which has its opposite terminal coupled to ground. The junction of thermistor 90 and resistor 160 is coupled to an integrator including resistor 162 and capacitor 164 and to a digital comparator 166 whose output terminal is coupled to signal input terminal $L_2$ of microprocessor 75. Comparator 166 includes a feedback resistor 168 and has its positive input terminal coupled to the output of voltage follower 130 of the D to A converter circuit coupled to output terminal $G_2$ of the microprocessor by means of resistor 169.

Operating power for the microprocessor is applied through a voltage reducing network including a resistor 170 coupled to $V_{cc}$ and having a bypass capacitor 172 coupled thereto and to ground. The regulated lower level voltage is applied to the $V_{dd}$ input terminal of the microprocessor by Zener diode 174 coupled to ground through diode 176 to supply approximately 7.5 VDC operating voltage for the microprocessor. The output signal lines SK, $S_0$, SI, and $D_0$ through $D_3$ are coupled to the display driver 80 and a non-volatile memory 87 comprising a NITRON NC7033LC chip in a conventional manner such that output data representative of vehicle direction and temperature is displayed on the dual display 35. Control inputs for actuating the microprocessor to display either or both temperature and vehicle direction as well as providing for calibration and variation correction is provided by switches 38, 39, 42 and 44 coupled to input terminals $L_7$, $L_6$, $L_5$ and $L_4$, respectively, of microprocessor 75 through interface circuit 85 comprising a pullup resistor for each input and commonly coupled to $V_{cc}$ at one terminal and individually coupled to one end of the switches with the opposite terminal of the switches coupled to ground. Thus, when a switch is actuated, it will provide a logic "0" input signal and when not actuated, a logic "1" input signal is applied to the microprocessor. The reset input terminal of the microprocessor is coupled to $V_{cc}$ through a resistor 178 bypassed by diode 179 and also to ground through capacitor 180 in a conventional manner. Having described the construction of the circuit forming the present invention, a description of the operation of the circuit first to provide the compass display function for the vehicle and then, the temperature controlling function is now presented in conjunction with the flow diagram of FIGS. 4 and 5.

OPERATION

The circuit of the present invention provides automatic calibration for compensation of the compass and variation correction for ease of use by the operator. When the system is first installed or, in the case of original equipment when the vehicle is delivered, the vehicle operator or the dealer positions the car facing in a magnetic north direction. This can be achieved by utilizing a magnetic compass to determine magnetic north and aligning the car in such direction. At the dealership level, the dealer will typically estalish this in a parking area for new vehicles incorporating this system of the present invention by painting or otherwise marking an area of the lot to indicate the direction of magnetic north. The operator then depresses the compass function switch 39 and simultaneously, using a ball point pen or the like, the calibration switch 42. In response to the simultaneous occurrence of these two switch closures, microprocessor 75 outputs at display 35 the display 'SET N', indicated by block 200 in FIG. 5. Also in response to this command, output $G_1$ is supplied with a 50% duty cycle signal integrated by circuit 78. The output of integrator 60 and comparator 120 applied to input $L_1$ of the microprocessor 75 is measured to determine its level. These steps are indicated by block 210 of the program flow diagram of FIG. 5 for the microprocessor. The voltage $e_1$ is tested to ascertain whether it is $\frac{1}{2}$ of $V_{cc}$ or 4.5 volts in the preferred embodiment. Inasmuch as it is desired to provide a 4.5 volt as a reference level for a magnetic north heading as the output signal from integrator 60, if this voltage is other than 4.5 volts, compensation due to localized magnetic fields or ferromagnetic material in the vicinity of the flux-gate sensor is required. The voltage test is indicated by block 212 in FIG. 4, and typically, it will be something other than $\frac{1}{2} V_{cc}$. The voltage is then tested to determine whether it is higher or lower than $\frac{1}{2} V_{cc}$, as indicated by block 214, and if it is higher, the microprocessor decreases the duty cycle, as indicated by block 216, to provide a lower average output signal at output terminal $G_1$ through integrator 78 and feedback resistor 81 tending to lower the voltage $e_1$ by injecting a DC current through sense windings 14. If the measured voltage is less than 4.5 volts, as indicated by block 218, the duty cycle is increased with a reverse effort. In either event, a new duty cycle is supplied, as indicated by block 220, and the voltage again measured, as indicated by block 222. If the voltage does not equal $\frac{1}{2} V_{cc}$, the adjustment of duty cycle through blocks 214 through 220 is continued, as indicated by the loop including path 223. Once the voltage has reached the desired 4.5 level, indicating that a signal corresponding to magnetic north is being supplied from the output of the integrator circuit 60 to the microprocessor, and therefore, microprocessor will supply a north output digital signal to display 35. The display is then momentarily blanked and flashes, as indicated by blocks 224 and 226, and a new instructional display 'SET W', indicated by block 228, is provided to display 35. This indicates to the operator to commence the compensation procedure for the westerly direction requiring initially that the car be moved 90° to the west from its initial position. Naturally, if the test of block 212 indicates the voltage was initially $\frac{1}{2} V_{cc}$, no compensation for the north/south flux-gate sensing coil 14 is required. In such case, as indicated by line 213, the computer will, without requiring adjustment of the duty cycle and the feedback signal to coil 14 through resistor output 'SET W', indicated by block 228.

The vehicle operator, upon seeing the flashing 'SET W' display, aligns the vehicle 90° from the magnetic north direction, and the microprocessor continuously checks the status of switch 42 to ascertain if the calibration switch has again been actuated. If not, the delay and blanking loop 231, 224 and 226 is repeated until such time as the operator depresses the calibration switch a second time for calibrating the the east/west direction. This continuous test of the calibration is indicated by block 230 in FIG. 4, and once the vehicle operator has actuated switch 42 a second time, microprocessor 75 provides a 50% duty cycle output on pin $G_0$ for the east/west sensing coil and the signal at input $L_0$ is tested. These steps are indicated by block 232 in FIG. 4, and in effect, the voltage at the output of integrator 62 is checked to ascertain whether or not it is equal to $\frac{1}{2} V_{cc}$, as indicated by block 234. Typically, as with the north/south compensation, the voltage will not equal to $\frac{1}{2} V_{cc}$, and the microprocessor then determines whether it was above or below $\frac{1}{2} V_{cc}$, as indicated by block 236. If the voltage is more than $\frac{1}{2} V_{cc}$, the duty cycle output is decreased, as indicated by block 238, to increase the negative feedback current through resistor 83 while if the output was less than $\frac{1}{2} V_{cc}$, the duty cycle output at pin $G_0$ is increased, as indicated by block 240, to supply negative feedback current and allow the input voltage to increase. The new duty cycle output and voltage reading function is indicated by block 242 after which the voltage is again tested, as indicated by block 244, and if necessary, the testing and adjustment of duty cycle procedure is repeated by the loop including feedback line 243. Once the voltage is equal to $\frac{1}{2} V_{cc}$, the duty cycle information at outputs $G_1$ and $G_0$, stored in RAM memory contained within the microprocessor 75, is supplied to the associated non-volatile memory 87 coupled to outputs $D_0$–$D_3$ and SK, S0 and SI of the microprocessor for permanent storage of this calibration or compass compensation information, as indicated by block 246. The program is then exited, as indicated by block 248. Naturally, if the duty cycle was initially correct and test 234 indicates the voltage was $\frac{1}{2} V_{cc}$ initially, this information is stored in memory 87, as indicated by block 246, and the compensation program is exited, as indicated by line 245.

Thus, by effectively measuring the integrated DC levels $e_1$ and $e_2$, provided by sensing coils 14 and 15 of the flux-gate sensor 13, through the digitally processed duty cycle technique of the microprocessor, when the vehicle is aligned in magnetic north and subsequently magnetic west directions, duty cycle information for controlling the output display to read N and W, respectively, is determined and such control information is stored in non-volatile memory for use by the compass in providing a compensated output signal correcting for local magnetic fields or ferromagnetic material which interferes with the sensing of magnetic north by the flux-gate sensor, once installed, in a particular vehicle. In order to correct for magnetic variation, which is a geographical phenomena by which true north varies from magnetic north at different geographic locations, variation correction is provided. In the United States, for example, the true north direction in which highways are typically aligned and magnetic north may vary significantly. Twenty degrees of variance between the true and magnetic north headings exist on the coastal regions of the United States with an approximate 40° difference from coast to coast. In order to correct for this error, the system of the present invention provides a variation correction circuit and program, as seen in reference to FIGS. 3 and 5.

The vehicle operator, once the compass system has been calibrated for compensation of the compass, drives the vehicle on a road whose direction is known to be true north. The variation correction switch 44 is actuated and display 35 displays 'TN' to the operator indicating the proper actuation of the variation correction entry signal, as indicated by block 300 in FIG. 5. Next, the microprocessor reads the input signals at input ports $L_0$ and $L_1$ and determines the actual display angle reading, as indicated by block 302. If the display angle information provided at input ports $L_0$ and $L_1$ are different than known signals to provide an exact 0° or 'N' output display, the signals supplied to these input ports is representative of the variation angle, and a correction signal (corresponding to the variation angle) to the actual voltage measurement to provide a true north display output signal is generated by the microprocessor 75 and stored in the non-volatile memory 87, as indicated by block 302 in FIG. 5. Once this is done, the program is exited, as indicated by block 306, and normal compass operation is provided by the vehicle operator upon actuation of switch 39. The actual heading information provided by sensor 13 is corrected by the microprocessor which adds the determined and stored compass variation correction angle representative signal to the detected heading signal to provide a corrected display output signal.

During use, after the calibration and variation of the compass system has been achieved, the compass can be selectively used by actuation of switch 39 which upon a first actuation provides a continuous compass output display and deactivated upon a second actuation of the momentary push-button switch.

The temperature display provided by the system is activated by the momentary actuation of temperature switch 38 providing an input signal at port $L_7$ of microprocessor 75 which then reads the input signal at port $L_2$ comprising digitized temperature representative information from comparator 166 driven by sensor 90 and integrated variable duty cycle signals from output $G_2$ of microprocessing 75. The ROM memory of microprocessor 75 includes preprogrammed temperature representative signals to correlate the signals provided at port $L_2$ and provide a display output signal representing the temperature of the sensor 90. In the event a 38° F. or below temperature is detected by sensor 90, the microprocessor provides a flashing display output to display the work 'ICE' alternately between the temperature display for a period of one minute to alert the operator that possible hazardous driving conditions may exist. The programming of the microprocessor 75 to provide this display output signal, as well as the temperature indicative display signals in response to the input sensed voltage, is conventional.

Thus, the system of the present invention provides the vehicle operator with a conveniently used and accurate octant heading compass display which provides N, NE, E, SE, S, SW, W, and NW displays as the vehicle heads in these directions. The microprocessor responds to signals from the flux-gate sensor 13 to change to a predetermined octant heading at an approximately $22\frac{1}{2}°$ switch-over point to always display the closest heading detected by the flux-gate sensor.

It will become apparent to those skilled in the art that various modifications to the preferred embodiment as described herein can be made without departing from the spirit or scope thereof as defined by the appended claims.

The embodiments of the invention in which an exclusive property or privilege is claimed are defined as follows:

1. An electrical compass system for a vehicle, said system including sensing means for sensing a magnetic field and providing output signals representative thereof, circuit means coupled to said sensing means for providing display output signals, and display means coupled to said circuit means and responsive to said display output signals for displaying the sensed magnetic field; wherein the improvement comprises compensation means for correcting the sensed and displayed magnetic field for a steady state local magnetic field interference; said compensation means comprising:
   means coupled to said circuit means for establishing a predetermined display output signal when said sensing means is positioned in predetermined alignment with a known magnetic field;
   comparing means coupled to said sensing means and to said circuit means for comparing signals from said sensing means and said display output signals and applying a control signal to said circuit means when signals from said sensing means correspond to a direction which differs from said predetermined display output signal; and
   means coupled to said circuit means and to said sensing means for applying a correction signal to said sensing means and said correction signal generated by said circuit means in response to said control signal from said comparing means to cause said predetermined display output signal to occur.

2. The system as defined in claim 1 wherein said means for establishing a predetermined display output signals comprises a controlled voltage source.

3. The system as defined in claim 1, wherein said sensing means is flux-gate sensor and said applying means is coupled to said controlled voltage source and to said sensor for applying a direct current correction signal to a winding of said sensor.

4. The system as defined in claim 3 wherein said controlled voltage source includes a variable duty cycle signal generator and integration circuit means for providing a direct current voltage having a level proportionate to the duty cycle output of said generator.

5. The system as defined in claim 4 wherein said comparing means and said generator are included in a microprocessor circuit.

6. The system as defined in claim 5 and further including means coupled to said circuit means for selectively storing a display output correction signal when the sensor is aligned in a predetermined true direction heading and for combining the display output signal and said correction signal to provide a true heading display signal to correct for geographic magnetic variation.

7. The system as defined in claim 6 wherein said storing means for said correction signal and said combining means includes a non-volatile memory coupled to said microprocessor.

8. The system as defined in claim 7 wherein said storing means includes switch means coupled to said microprocessor for providing a control signal when actuated by the vehicle operator for storing said correction signal when the vehicle and sensor mounted thereto is aligned in a known true direction.

9. A digital compass system for a vehicle comprising:
   a magnetic field sensor;
   a sensor circuit coupled to said sensor for providing output signals representative of the orientation of said sensor with respect to a magnetic field;
   a microprocessor and interface circuit means coupling said microprocessor to said sensor circuit for providing display output signals representative of the magnetic direction of orientation of said sensor;
   display means coupled to said microprocessor for displaying said magnetic direction; and
   compensation circuit means including operator actuated switch means coupled to said microprocessor for supplying signals applied to said sensor to compensate for local magnetic field interference which otherwise causes said sensor to provide output signals which deviate from the actual magnetic orientation of said sensor with respect to the earth's magnetic field such that the actual magnetic orientation of said sensor will be displayed.

10. The system as defined in claim 9 wherein said sensor is a flux-gate sensor having a pair of sensing coils and said compensation circuit means includes a direct current feedback circuit coupled between said microprocessor and said sensing coils to change the output signals of said sensor and thus the display output signals to provide a first reference direction display when said sensor is aligned in a first magnetic reference direction and a second reference display when said sensor is aligned in a second magnetic reference direction.

11. The system as defined in claim 10 wherein said first and second reference direction are orthogonal with respect to each other.

12. The system as defined in claim 11 and further including means for selectively storing a display output correction signal when the sensor is aligned in a predetermined true direction heading and for combining the display output signal and said correction signal to provide a true heading display signal to correct for geographic magnetic variation.

13. The system as defined in claim 12 wherein said storing means for said correction signal and said combining means includes a non-volatile memory coupled to said microprocessor.

14. The system as defined in claim 13 wherein said storing means includes switch means coupled to said microprocessor for providing a control signal when actuated by the vehicle operator for storing said correction signal when the vehicle and sensor mounted thereto is aligned in a known true direction.

15. The system as defined in claim 9 wherein said display means includes an octant alpha display for displaying octant compass headings.

16. The system as defined in claim 9 and further including a temperature sensor and means coupling said temperature sensor to said microprocessor for supplying temperature representative signals to said microprocessor which compares said temperature representative signals with stored temperature display signals for providing temperature display output signals in response to said temperature representative signals.

17. The system as defined in claim 16 wherein said stored temperature display signals including a temperature warning signal and said microprocessor provides a temperature warning output signal when input temperature representative signals correspond to said temperature warning signal.

18. The system as defined in claim 17 wherein said display means includes a numeric display for displaying the sensed temperature.

19. A digital electrical compass system for a vehicle comprising:
an electrical magnetic field sensor for mounting to a vehicle;
a microprocessor coupled to said sensor and including memory circuit means programmed to respond to signals from said sensor to provide display output signals therefrom;
a compass calibration switch coupled to said microprocessor for providing a calibration command thereto when actuated to cause said microprocessor to supply a sensor correction signal applied to said sensor to provide a predetermined display output signal in response thereto when the vehicle is aligned in a predetermined magnetic position; and
display means coupled to said microprocessor for displaying the vehicle's heading.

20. The system as defined in claim 19 and further including a compass compensation switch coupled to said microprocessor for providing a command signal thereto when actuated to determine and store a variation correction signal when said sensor is aligned in a known true direction and for adding said correction signal to the display output signals to provide a true heading output display.

21. The system as defined in claim 20 and further including temperature sensing means coupled to said microprocessor for supplying signals thereto for providing a display of temperature sensed by said temperature sensor.

22. The system as defined in claim 21 wherein said microprocessor includes storage circuit means for storing a temperature alarm signal corresponding to a predetermined temperature and means for providing a temperature alarm signal applied to said display means when the sensed temperature reaches said predetermined temperature.

23. A digital control and display module for a vehicle comprising:
a housing for central mounting to a vehicle roof near the windshield and including a digital display means for providing temperature and compass heading information;
temperature and compass control switches mounted to said housing; and
an electrical circuit including temperature sensing means and magnetic field sensing means, said circuit coupled to said switch means and to said display means and mounted within said housing for selectively displaying to a vehicle operator temperature and compass heading information.

24. A digital electrical compass system for a vehicle comprising:
an electrical magnetic field sensor for mounting to a vehicle;
circuit means coupled to said sensor and responsive to signals from said sensor to provide display output signals representative of the position of said sensor with respect to a magnetic field; said circuit means including means for providing a sensor correction signal applied to said sensor to provide a predetermined display output signal in response thereto when the vehicle is aligned in a predetermined position with respect to the earth's magnetic field; and means for providing a variation correction signal when said sensor is aligned in a known true direction, said variation correction signals employed to modify direction information signals from said sensor to provide said display output signals which represent the true heading of the vehicle; and
display means coupled to said circuit means and responsive to said display output signals for displaying the vehicle's true heading.

25. The system as defined in claim 24 wherein said circuit means comprises a microprocessor.

26. A digital compass system for a vehicle comprising:
a magnetic field sensor;
circuit means coupled to said sensor for providing output signals repesentative of the orientation of said sensor with respect to a magnetic field, said circuit means including operator actuated switch means to effect operation of said compass system; and
display means coupled to said circuit means for displaying the detected magnetic direction, said display mens also providing operator prompting information in response to the actuation of said operator actuated switch means.

* * * * *